United States Patent
Jun et al.

(10) Patent No.: US 8,435,724 B2
(45) Date of Patent: May 7, 2013

(54) FABRICATING METHOD FOR TOUCH SCREEN PANEL

(75) Inventors: Woo-Sik Jun, Yongin (KR); Do-Youb Kim, Yongin (KR); Ung-Soo Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 233 days.

(21) Appl. No.: 12/957,704

(22) Filed: Dec. 1, 2010

(65) Prior Publication Data

US 2011/0207055 A1 Aug. 25, 2011

(30) Foreign Application Priority Data

Feb. 22, 2010 (KR) ........................ 10-2010-0015703

(51) Int. Cl.
*G03F 7/20* (2006.01)
(52) U.S. Cl.
USPC ............ 430/318; 430/317; 430/319; 430/321
(58) Field of Classification Search .................... None
See application file for complete search history.

(56) References Cited

U.S. PATENT DOCUMENTS

| | | | | |
|---|---|---|---|---|
| 2010/0309151 A1* | 12/2010 | Cheng et al. | ......... | 345/173 |
| 2011/0006998 A1* | 1/2011 | Kang et al. | ......... | 345/173 |
| 2011/0043383 A1* | 2/2011 | Kang et al. | ......... | 341/5 |
| 2011/0205168 A1* | 8/2011 | Jun | ......... | 345/173 |

FOREIGN PATENT DOCUMENTS

| | | |
|---|---|---|
| JP | 3134925 U | 8/2007 |
| JP | 2009-230735 | 10/2009 |
| JP | 2010-140370 | 6/2010 |
| KR | 10-2008-0058862 | 6/2008 |
| KR | 10-2008-0110477 | 12/2008 |
| KR | 10-2009-0024451 | 3/2009 |

OTHER PUBLICATIONS

Japanese Decision of Grant dated Aug. 7, 2012, for corresponding Japanese Patent application 2010-099988, (3 pages).

* cited by examiner

*Primary Examiner* — John A. McPherson
(74) *Attorney, Agent, or Firm* — Christie, Parker & Hale, LLP

(57) ABSTRACT

In a fabricating method of a touch screen panel, a conductive layer and an insulating layer are sequentially formed on a same surface of a transparent substrate. The conductive layer and the insulating layer are co-patterned using a halftone mask to form first connection patterns having separated patterns and the insulating layer being patterned on the first connection patterns to expose regions of the first connection patterns. A transparent electrode layer is formed on the transparent substrate having the first connection patterns and the insulating layer. The transparent electrode layer is patterned to form first sensing patterns connected to the first connection patterns through the exposed regions of the first connection patterns and connected along a first direction, and to form second sensing patterns disposed between the first sensing patterns, wherein the second sensing patterns are insulated from the first sensing patterns and connected along a second direction.

16 Claims, 5 Drawing Sheets

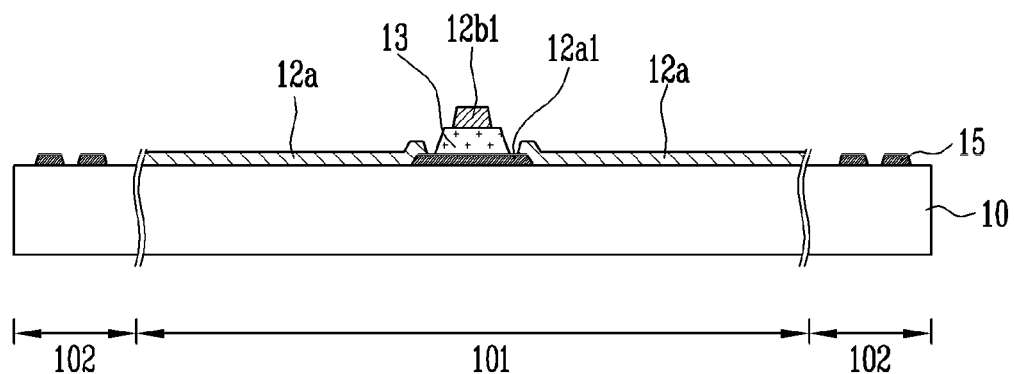

FABRICATING METHOD FOR TOUCH SCREEN PANEL

CROSS-REFERENCE TO RELATED APPLICATION

This application claims the benefit of Korean Patent Application No. 10-2010-0015703, filed Feb. 22, 2010, in the Korean Intellectual Property Office, the disclosure of which is incorporated herein by reference.

BACKGROUND

1. Field

Aspects of the present invention relate to a fabricating method for a touch screen panel in which the number of mask processes is reduced.

2. Description of the Related Art

A touch screen panel is an input device that allows a user's instruction to be inputted by a user's hand or object selecting an instruction content displayed on a screen such as an image display device. To this end, the touch screen panel is disposed on a front face of the image display device in order to convert a contact position into an electrical signal. The user's hand or object is directly in contact with the touch screen panel at the contact position. Accordingly, the instruction content selected by contacting the contact position is inputted as an input signal to the image display device.

Since such a touch screen panel can be used instead of a separate input device connected to an image display device, such as a keyboard or mouse, use of the touch screen panel has increased. Touch screen panels are divided into a resistive overlay touch screen panel, a photosensitive touch screen panel, a capacitive touch screen panel, or other similar touch screen panels. Among these touch screen panels, the capacitive touch screen panel converts a contact position into an electrical signal by sensing a change in capacitance between a conductive sensing pattern and an adjacent sensing pattern, ground electrode or the like when a user's hand or object contacts the touch screen panel.

The capacitive touch screen panel includes a plurality of first sensing patterns connected along a first direction and a plurality of second sensing patterns connected along a second direction, so that a coordinate of the contact position can be detected. The first and second sensing patterns are formed of the same material and in the same layer so that the entire touch screen panel can have uniform sensitivity to touch.

However, first connection patterns connecting the first sensing patterns in the first direction and second connection patterns connecting the second sensing patterns in the second direction are formed in different layers. The first sensing patterns and the second connection patterns are formed through different processes in order to prevent the first and second connection patterns from being short-circuited. In addition, an insulating layer insulating the first and second connection patterns from each other is formed therebetween.

Patterning processes are separately performed in a process forming the first connection patterns, a process of forming the second connection patterns and a process of forming the insulating layer. Therefore, all of these processes require mask processes. Accordingly, the fabrication process of the touch screen panel is complicated, and the fabrication efficiency of the touch screen panel is lowered.

SUMMARY

Aspects of the present invention provide a fabricating method for a touch screen panel in which the number of mask processes is reduced.

According to aspects of the present invention, there is provided a fabricating method for a touch screen panel, which includes sequentially forming a conductive layer and an insulating layer on a same surface of a transparent substrate; co-patterning the conductive layer and the insulating layer using a halftone mask to form first connection patterns having separated patterns, the insulating layer being patterned on the first connection patterns to expose regions of the first connection patterns; forming a transparent electrode layer on the transparent substrate having the first connection patterns and the insulating layer; and patterning the transparent electrode layer to form first sensing patterns connected to the first connection patterns through the exposed regions of the first connection patterns connected along a first direction, and to form second sensing patterns disposed between the first sensing patterns, wherein the second sensing patterns are insulated from the first sensing patterns and connected along a second direction.

According to another aspect of the present invention, the co-patterning of the conductive layer and the insulating layer using the halftone mask may include forming a photoresist, having a first height and a second height lower than the first height, on the insulating layer using the halftone mask; removing the conductive layer and the insulating layer at regions other than regions below the photoresist through an etching process; removing the photoresist having the second height and the insulating layer beneath the photoresist through ashing and etching processes to expose the exposed regions of the first connection patterns; and removing the photoresist that remains on the insulating layer through an ashing process.

According to another aspect of the present invention, the removing of the conductive layer and the insulating layer, formed at the other regions except the lower portion of the photoresist, through the etching process may include removing the insulating layer through a dry etching process and then removing the conductive layer through a wet etching process, wherein the conductive layer is over-etched so that the side of the conductive layer is positioned further inward than that of the insulating layer.

According to another aspect of the present invention, in the co-patterning of the conductive layer and the insulating layer using the halftone mask, the photoresist having the second height may be formed on an interconnection area in order to pattern position detecting lines on the interconnection area while patterning the first connection patterns.

According to another aspect of the present invention, in the patterning of the transparent electrode layer, the second connection patterns connecting the second sensing patterns along the second direction may be integrally formed with the second sensing patterns.

According to aspects of the present invention, the conductive layer and the insulating layer are co-patterned using a halftone mask, so that the first connection patterns and the insulating layer can be formed in one mask process. Accordingly, the number of mask processes is decreased, and thus, the fabrication process is simplified.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A to 5G are sectional views sequentially illustrating a fabricating method of the touch screen panel shown in FIG. 3.

DETAILED DESCRIPTION

Figure 1:
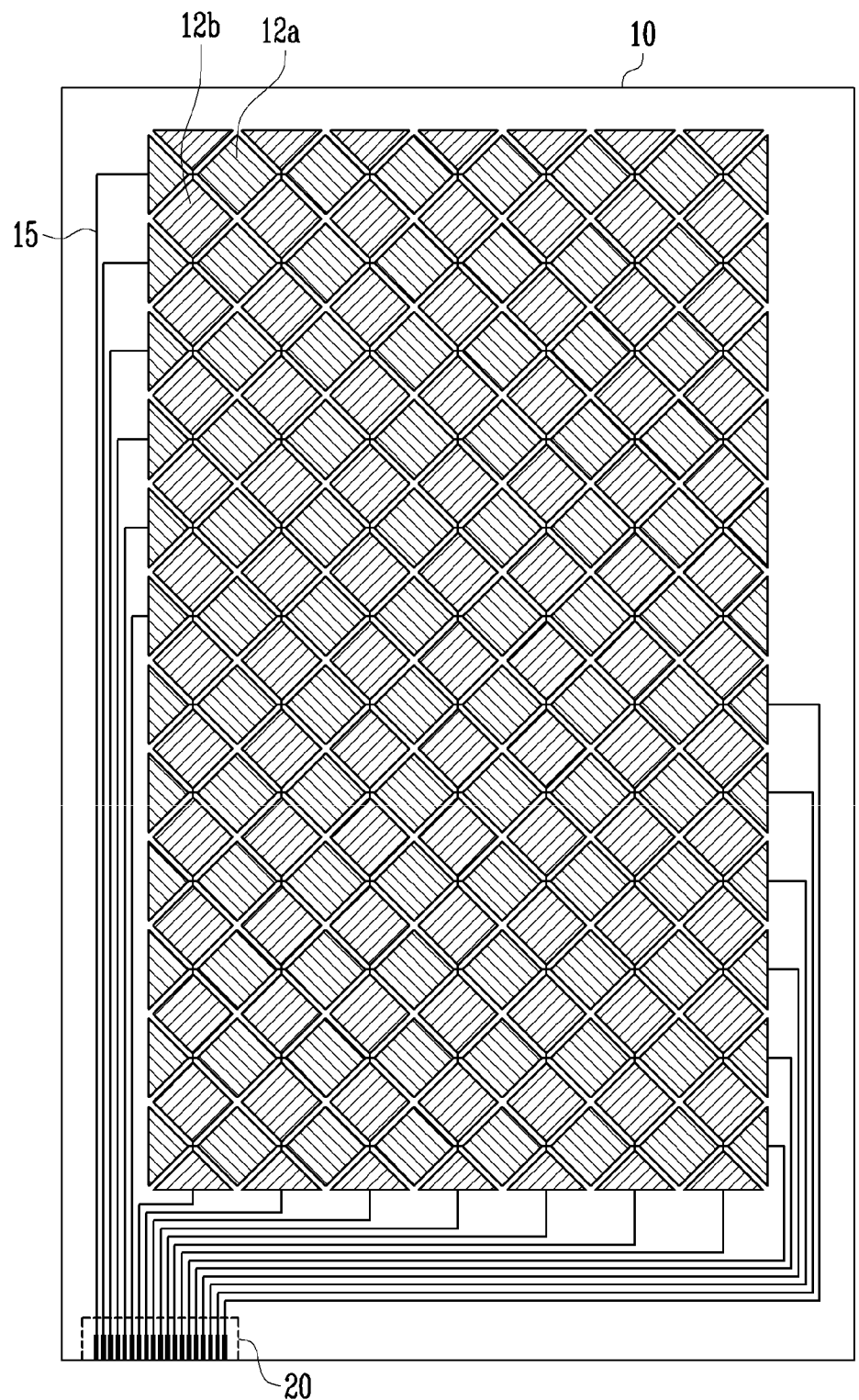
FIG. 1 is a plan view schematically showing a touch screen panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is to be understood that where it is stated herein that a first element is said to be disposed or formed "on" or "in" or "connected to" a second element, the first element can directly contact the second element, or can be separated from the second element by one or more other elements located therebetween. In contrast, when an element is referred to as being disposed or formed "directly on" or "directly connected to" another element, there are no intervening elements present.

Figure 2:
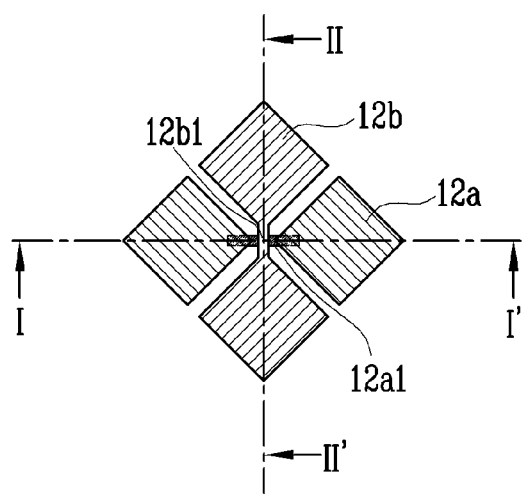
FIG. 2 is a main part plan view showing sensing patterns and connection patterns shown in FIG. 1.

FIG. 1 is a plan view schematically showing a touch screen panel according to an embodiment of the present invention. FIG. 2 is a main part plan view showing sensing patterns and connection patterns, shown in FIG. 1. Referring to FIGS. 1 and 2, the touch screen panel according to the embodiment of the present invention includes a transparent substrate 10; first sensing patterns 12a and second sensing patterns 12b, formed on the transparent substrate 10; and position detecting lines 15 connecting the first and second sensing patterns 12a and 12b to an external drive circuit through a pad portion 20.

The first sensing patterns 12a are formed to be connected in a first direction, e.g., a row direction, using a transparent electrode material such as indium tin oxide (ITO). Thus, rows of the first sensing patterns 12a are connected to respective ones of the position detecting lines 15. As shown in FIG. 2, the first sensing patterns 12a are patterned to have separated patterns and are connected along the first direction by first connection patterns 12a1.

The first connection patterns 12a1 are formed in a process different from a process forming the first sensing patterns 12a. Regions of the first connection patterns 12a1 contact the first sensing patterns 12a so that they connect the first sensing patterns 12a to each other along the first direction while being electrically connected to the first sensing patterns 12a. The second sensing patterns 12b are formed using a transparent electrode material and are disposed in the same layer as the first sensing patterns 12a. The second sensing patterns 12b connected along a second direction, e.g., a column direction, intersecting the rows of the first sensing patterns 12a. Thus, the second sensing patterns 12b are insulated from the first sensing patterns 12a.

If the first and second sensing patterns 12a and 12b are positioned in the same layer, the touch screen panel can have entirely uniform sensitivity to touch. The second sensing patterns 12b are patterned to be connected along the second direction in the respective patterning process. For example, the second sensing patterns 12b are patterned to be connected along the second direction by second connection patterns 12b1, which are integrally formed as shown in FIG. 2. However, aspects of the present invention are not limited thereto, and the second connection patterns 12b1 connecting the second sensing patterns 12b may be separately formed in a different process from a process of forming the second sensing patterns 12b.

Column lines of the second sensing patterns 12b are connected to the respective position detecting lines 15. The position detecting lines 15 connect the first and second sensing patterns 12a and 12b to an external drive circuit (not shown) such as a position detecting circuit through the pad portion 20. The position detecting lines 15 are disposed at the periphery of the touch screen panel while avoiding a touch screen active area in which images are displayed. The position detecting lines 15 are formed of a low-resistance material such as molybdenum (Mo), silver (Ag), titanium (Ti), copper (Cu), aluminum (Al) or molybdenum/aluminum/molybdenum (Mo/Al/Mo), in addition to the transparent electrode material used for forming the first and second sensing patterns 12a and 12b. However, aspects of the present invention are not limited thereto, and the position detecting lines 15 may be formed of other suitable materials.

The aforementioned touch screen panel is a capacitive touch screen panel. If a contact object, such as a user's hand or touch stick, contacts the touch screen panel, a change in capacitance corresponding to a contact position is transferred from the sensing patterns 12a and 12b to the external drive circuit (not shown) via the position detecting lines 15 and the pad portion 20. The change in capacitance is converted into an electrical signal, by X and Y input processing circuits (not shown) and the like, so that the contact position is detected.

The aforementioned touch screen panel is formed on an independent substrate so that it is attachable to a front face of an image display device and the like. However, aspects of the present invention are not limited thereto, and the touch screen panel may be integrally implemented with a display panel of the image display device. For example, the touch screen panel may be integrally implemented with an organic light emitting display panel or liquid crystal display panel on a top surface of an upper substrate of the organic light emitting display panel or liquid crystal display panel. As such, the touch screen panel is integrally implemented with a display panel, thereby providing a thin image display device.

Figure 3:
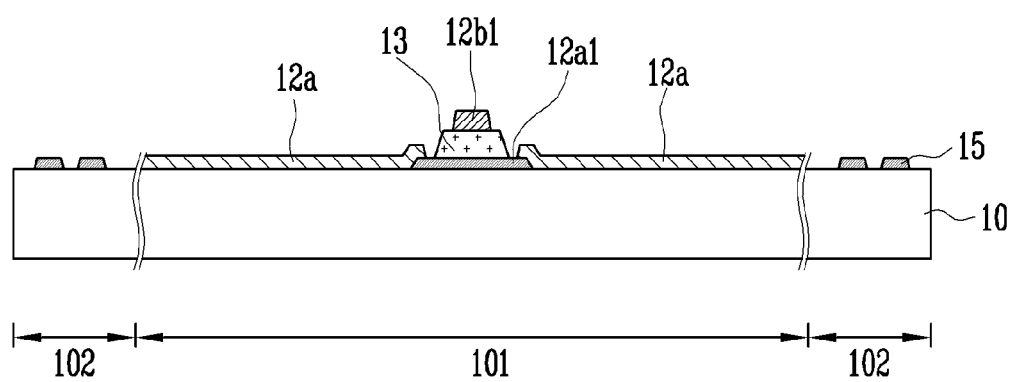
FIG. 3 is a main part plan view of the touch screen panel of FIG. 1, viewed from one direction.
Figure 4:
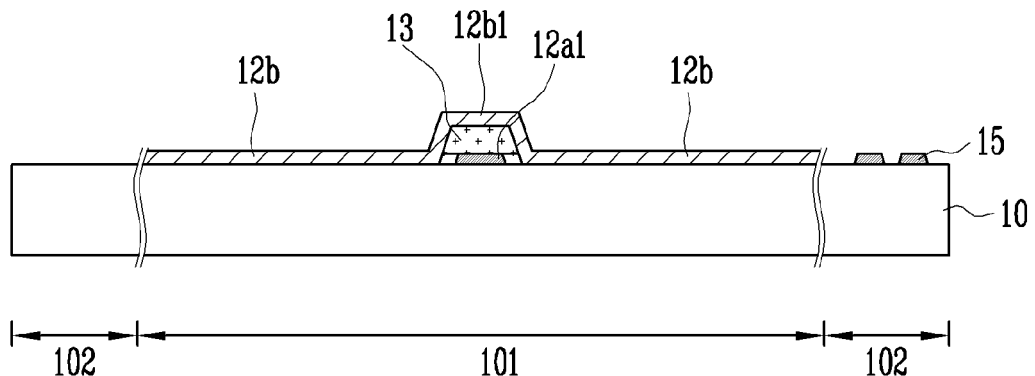
FIG. 4 is a main part plan view of the touch screen panel of FIG. 1, viewed from another direction.

FIG. 3 is a main part plan view of the touch screen panel of FIG. 1, viewed from one direction. FIG. 4 is a main part plan view of the touch screen panel of FIG. 1, viewed from another direction. For convenience of illustration, a touch screen active area 101 of FIG. 3 shows a section taken along line I-I' of FIG. 2, and a touch screen active area 101 of FIG. 4 shows a section taken along line II-II' of FIG. 2. The structure of the touch screen panel of FIGS. 3 and 4 will be described with reference to FIGS. 1 and 2. The touch screen panel is divided into a touch screen active area 101 formed at the central portion thereof and an interconnection area 102 formed at the edge thereof.

The touch screen active area 101 includes the first connection patterns 12a1 formed on one surface of the transparent substrate 10 and an insulating layer 13 formed on the first connection patterns 12a1 to expose regions of the first connection patterns 12a1. The touch screen active area 101 also includes the first sensing patterns 12a connected to the first connection patterns 12a1 through the exposed regions of the first connection patterns 12a1 and connected along the first direction. The touch screen active area 101 further includes second sensing patterns 12b formed between the first sensing patterns 12a to be insulated from the first sensing patterns 12a and connected along the second direction through the second connection patterns 12b1 integrally formed on the insulating layer 13.

That is, in the present embodiment, the insulating layer 13 is disposed at each intersection portion of the first and second connection patterns 12a1 and 12b1 so as to prevent short circuits of the first and second connection patterns 12a1 and 12b1. However, as shown in FIG. 3, the insulating layer 13 exposes regions of the first connection patterns 12a1 so that the first connection patterns 12a1 are connected to the first sensing patterns 12a through the exposed regions thereof. That is, the first sensing patterns 12a come in direct contact with the first connection patterns 12a1 through the exposed regions of the first connection patterns 12a1. Thus, the first sensing patterns 12a are connectable along the first direction.

In order to effectively prevent the short circuits of the first and second connection patterns 12a1 and 12b1, the first connection patterns 12a1 are over-etched at regions where the second connection patterns 12b1 are extended to the second sensing patterns 12a, as shown in FIG. 4. Accordingly, sides of the first connection patterns 12a1 are positioned further inward than sides of the insulating layer 13 at the regions in which the second connection patterns 12b1 are extended to the second sensing patterns 12a, thereby ensuring the electrical stability of the touch screen panel. That is, a lower portion of the insulating layer in one direction of the regions in which the second connection patterns 12b1 are extended to the second sensing pattern 12b is formed wider than an upper portion of each of the first connection patterns 12a1.

The touch screen active area 101 is formed transparent so that light can be transmitted from a display panel (not shown) below the touch screen panel. That is, the first and second sensing patterns 12a and 12b, the second connection patterns 12b1 and the insulating layer 13 are formed of a transparent material having a minimum transmittance. Herein, the term "transparency" includes not only 100% transparency but also transparency having a high optical transmittance less than 100% transparency.

To this end, the first and second sensing patterns 12a and 12b and the second connection patterns 12b1 are formed of a transparent electrode material such as ITO. The insulating layer 13 is formed of a transparent insulating material such as a silicon oxide ($SiO_2$). However, aspects of the present invention are not limited thereto, and the first and second sensing patterns 12a and 12b, the second connection patterns 12b1, and the insulating layer 13 may be formed of other suitable materials.

However, the first connection patterns 12a1 are formed of a low-resistance metal or other suitable materials. A line width or length of the first connection patterns 12a1 is adjusted so that it is possible to prevent the first connection patterns 12a1 from being recognized by or visible to a user's eyes. The interconnection area 102, which is also referred to as a dummy area, includes the position detecting lines 15. The position detecting lines 15 are formed of the same material in the same process as the first connection patterns 12a1. However, aspects of the present invention are not limited thereto, and the position detecting lines 15 may be formed of other suitable materials and in other processes.

According to aspects of the present invention, the first connection patterns 12a1 and the insulating layer 13 are patterned using one halftone mask, thereby decreasing the number of mask processes and simplifying the fabrication process. This will be described in detail later with reference to FIGS. 5A to 5G. Also, although not shown in FIGS. 3 and 4, a separate protection layer preventing surface scratches and the like is further formed above the transparent substrate 10 on which the first and second sensing patterns 12a and 12b are formed. However, aspects of the present invention are not limited thereto, and the separate protection layer may not be formed above the transparent substrate 10.

In FIG. 3, a size of the connection patterns 12a1 and 12b1 are exaggerated as compared with that of the sensing patterns 12a and 12b for convenience of illustration. However, as shown in FIG. 1, the connection patterns 12a1 and 12b1 are formed to have a size at which they are difficult to be recognized.

FIGS. 5A to 5G are sectional views sequentially illustrating a fabricating method of the touch screen panel shown in FIG. 3. The fabrication method of the touch screen panel, according to the present embodiment of the present invention, will be described with reference to FIGS. 5A to 5G. A transparent substrate 10 is prepared, and a conductive layer 11 and an insulating layer 13 are formed on one surface of the transparent substrate 10. Here, the transparent substrate 10 is an upper substrate of a display panel, a separate substrate of a touch panel, a window substrate, or other similar substrates.

Figure 5A:
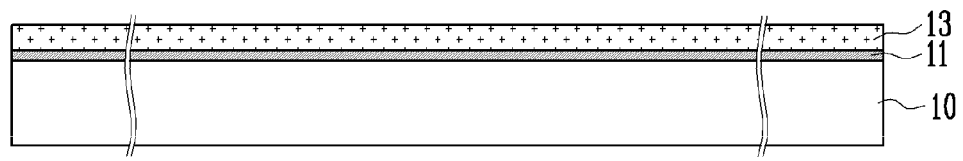

The conductive layer 11 is used to form first connection patterns 12a1 and position detecting lines 15. The conductive layer 11 is formed by depositing a low-resistance material, such as molybdenum (Mo), on an entirety of the transparent substrate 10. However, aspects of the present invention are not limited thereto and the conductive layer 11 may be formed of other suitable materials and may be formed on a part of the transparent substrate 10. The insulating layer 13 is formed by depositing a transparent insulating material, such as a silicon oxide ($SiO_2$), on an entirety of the conductive layer 11, as shown in FIG. 5A. However, aspects of the present invention are not limited thereto and the insulating layer 13 may be formed of other suitable materials and may be formed on a part of the conductive layer 11.

Subsequently, the conductive layer 11 and the insulating layer 13 are co-patterned using a halftone mask to form the first connection patterns 12a1 having separated patterns. The co-patterning of the conductive layer 11 and the insulating layer 13 using the halftone mask also forms the position detecting lines 15 and a part of the insulating layer 13 partially positioned on the first connection patterns 12a1 in order to expose regions of the first connection patterns 12a1.

Figure 5B:
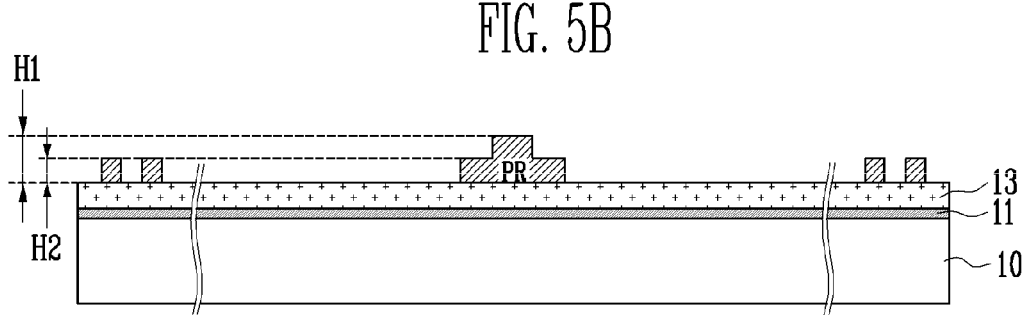

More specifically, as shown in FIG. 5B, a photoresist PR having different heights, i.e., a first height H1 and a second height H2 lower than the first height H1, is formed on the insulating layer 13 using one halftone mask (not shown). At this time, the photoresist PR having the first height H1 is formed at regions to partially remain on the first connection patterns 12a1 by patterning the insulating layer 13. Additionally, the photoresist PR having the second height H2 is formed at the exposed regions of the first connection patterns 12a1 and at regions in which the position detecting lines 15 will be formed.

The conductive layer 11 and the insulating layer 13, formed at the other regions except a lower portion of the photoresist PR, are removed through an etching process. For example, the insulating layer 13 formed at the other regions except the lower portion of the photoresist PR is removed through a dry etching process. Additionally, the conductive layer 11 formed at the exposed region of the insulating layer 13 is removed by further performing a wet etching process. Thus, the first connection patterns 12a1 and the position detecting lines 15 are formed.

That is, the first connection patterns 12a1 and the position detecting lines 15 are simultaneously patterned using a same material in the process of co-patterning the conductive layer 11 and the insulating layer 13 using the one halftone mask. The conductive layer 11 is etched in the wet etching process. However, aspects of the present invention are not limited thereto, and the conductive layer 11 may be partially etched in the dry etching process of the insulating layer 13 and may be additionally etched in the wet etching process.

Figure 5C:
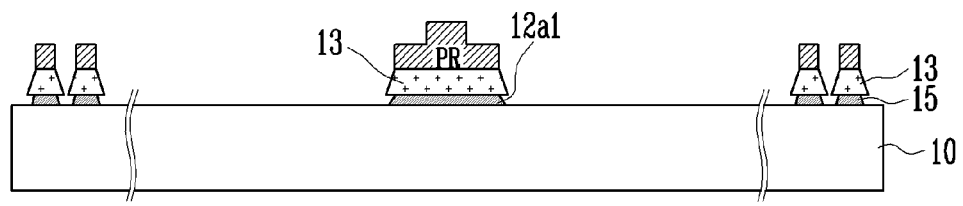

An etchant for the material constituting the conductive layer 11 is used in the wet etching process of the conductive layer 11. The conductive layer 11 is over-etched using an etchant having a high etching rate with respect to the conductive layer 11 so that the side of the conductive layer 11 is positioned further inward than that of the insulating layer 13. For example, the conductive layer 11 is over-etched so that the side of the conductive layer 11 is positioned further inward by about 1 to 2 μm than that of the insulating layer 13. However, aspects of the present invention are not limited thereto, and the conductive layer 11 may be positioned inward at other suitable distances. As shown in FIG. 5C, the conductive layer 11 is patterned so that the first connection patterns 12a1 are formed at a touch screen active area 101 and the position detecting lines 15 are formed at an interconnection area 102.

The side of the first connection patterns 12a1 formed by over-etching the conductive layer 11 is finally positioned further inward than that of the insulating layer 13 in the direction shown in FIG. 4. Thus, short circuits of the first and second connection lines 12a1 and 12b1 are prevented, thereby increasing the electrical stability of the touch screen panel. The photoresist PR having the second height H2 is removed through a subsequent ashing process. At this time, an upper portion of the photoresist PR having the first height H1 is also removed so that the height of the photoresist PR is lowered.

The ashing process refers to a process of burning and removing a photoresist under a high-temperature atmosphere. At this time, the ashing process is performed in the form of a chemical reaction that promotes a pure radical reaction, excluding the ion effect. In other words, the photoresist PR is removed by forming carbon dioxide through reaction of oxygen radicals with carbon bonds of the photoresist. However, aspects of the present invention are not limited thereto and the photoresist PR may be removed by other suitable processes.

Figure 5D:
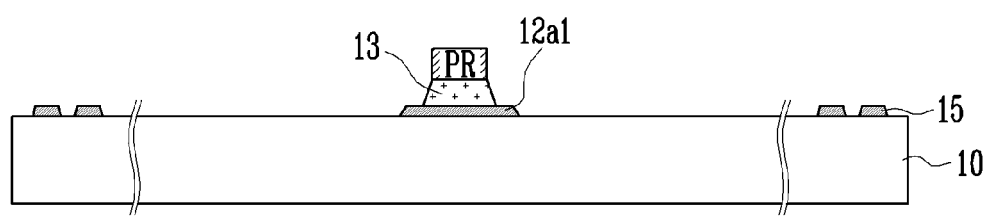

If the photoresist PR having the second height H2 is removed, the insulating layer 13 positioned beneath the removed photoresist PR is exposed. Thus, the exposed portion of the insulating layer 13 is removed through a dry etching process or a wet etching process using a buffered oxide etchant (BOE). However, aspects of the present invention are not limited thereto, and other suitable processes may be used to remove the exposed portion of the insulating layer 13. Accordingly, regions of the first connection patterns 12a1, which are contact regions contacting the first sensing patterns 12a, are exposed. As illustrated in FIG. 5D, the photoresist PR having the second height H2 and the insulating layer 13 beneath the photoresist PR are removed through the ashing and etching processes, so that the exposed regions of the first connection patterns 12a1 are exposed.

Figure 5E:
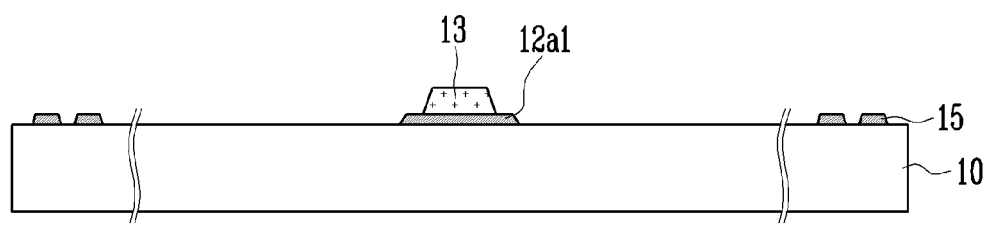

As illustrated in FIG. 5E, the photoresist PR that remains on the insulating layer 13 is removed through an ashing process, thereby completing the patterning process of the first connection patterns 12a1, the position detecting lines 15 and the insulating layer 13. Subsequently, a transparent electrode layer 12' is formed on the entirety of the transparent substrate 10 having the first connection patterns 12a1, the position detecting lines 15 and the insulating layer 13 formed thereon.

Figure 5F:
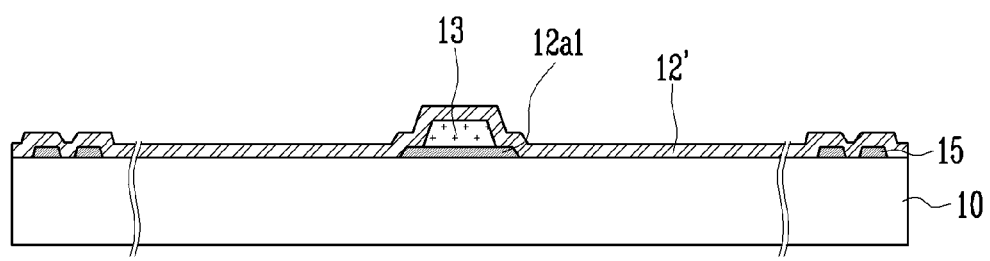

As shown in FIG. 5F, the transparent electrode layer 12' is used to form the first and second sensing patterns 12a and 12b and the second connection patterns 12b1. The transparent electrode layer 12' is formed by depositing a transparent material such as ITO on the entirety of the transparent substrate 10. However, aspects of the present invention are not limited thereto, and the transparent electrode layer 12' may be formed of other suitable materials and may be formed on a part of the transparent substrate 10. The transparent electrode layer 12' is patterned using a separate mask (not shown), thereby forming the plurality of sensing patterns 12a connected to the first connection patterns 12a1 through the exposed regions of the first connecting patterns 12a1.

At this time, although not shown in the sectional view of this figure, the plurality of second sensing patterns 12b are formed by co-patterning the first and second sensing patterns 12a and 12b so that the second sensing patterns 12b are insulated from the first sensing patterns 12a between the first sensing patterns 12a.

As shown in FIG. 5G, the second sensing patterns 12b are formed to be connected along the second direction by the second connection patterns 12b1. The second sensing patterns 12b and the second connection patterns 12b1 are integrally formed in the same process.

According to the fabrication method of the touch screen panel as described above, the conductive layer 11 and the insulating layer 13 are co-patterned using one halftone mask, thereby forming the first connection patterns 12a1 and the insulating layer 13 in one mask process. Accordingly, the number of mask processes is decreased, and thus, the fabrication process is simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fabricating method of a touch screen panel, comprising: sequentially forming a conductive layer and an insulating layer on a same surface of a transparent substrate;
   co-patterning the conductive layer and the insulating layer using a halftone mask to form first connection patterns having separated patterns, the insulating layer being patterned on the first connection patterns to expose regions of the first connection patterns;
   forming a transparent electrode layer on the transparent substrate having the first connection patterns and the insulating layer; and
   patterning the transparent electrode layer to form first sensing patterns connected to the first connection patterns through the exposed regions of the first connection patterns connected along a first direction, and to form second sensing patterns disposed between the first sensing patterns,
   wherein the second sensing patterns are insulated from the first sensing patterns and are connected along a second direction, and
   wherein the conductive layer is over-etched so that the side of the conductive layer is positioned further inward than that of the insulating layer.

2. The fabricating method according to claim 1, wherein the co-patterning of the conductive layer and the insulating layer using the halftone mask comprises: f
   forming a photoresist, having a first height and a second height lower than the first height, on the insulating layer using the halftone mask;

removing the conductive layer and the insulating layer at regions other than regions beneath the photoresist through an etching process;

removing the photoresist having the second height and the insulating layer regions beneath the photoresist having the second height through ashing and etching processes to expose the exposed regions of the first connection patterns; and removing the photoresist that remains on the insulating layer through an ashing process.

3. The fabricating method according to claim 2, wherein the removing of the conductive layer and the insulating layer, formed at the other regions except the lower portion of the photoresist, through the etching process comprises removing the insulating layer through a dry etching process and then removing the conductive layer through a wet etching process.

4. The fabricating method according to claim 2, wherein, in the co-patterning of the conductive layer and the insulating layer using the halftone mask, the photoresist having the second height is formed on an interconnection area in order to pattern position detecting lines on the interconnection area while patterning the first connection patterns.

5. The fabricating method according to claim 4, wherein the position detecting lines are formed of the same material as the first connection patterns.

6. The fabricating method according to claim 1, wherein, in the patterning of the transparent electrode layer, second connection patterns connecting the second sensing patterns along the second direction are integrally formed with the second sensing patterns.

7. The fabricating method according to claim 6, wherein the insulating layer is disposed between the first connection patterns and the second connection patterns.

8. The fabricating method according to claim 1, wherein the first sensing patterns are integrally formed with the first connection patterns.

9. The fabricating method according to claim 1, wherein the first direction is perpendicular to the second direction.

10. A fabricating method of a touch screen panel having a conductive layer and an insulating layer sequentially formed on a transparent substrate, the fabricating method comprising:

co-patterning the conductive layer and the insulating layer using a halftone mask to form first connection patterns, each separated from each other, and to form respective areas of the insulating layer exposing regions of the first connection patterns;

forming a transparent electrode layer on the transparent substrate having the co-patterned conductive layer and insulating layer;

patterning the transparent electrode layer to form first sensing patterns connected to the exposed regions of the first connection patterns and to form second sensing patterns connected to each other by second connection patterns, wherein the second sensing patterns are adjacent to the first sensing patterns, wherein the first connection patterns extend in a first direction and the second connection patterns extend in a second direction, and wherein the conductive layer is over-etched so that the side of the conductive layer is positioned further inward than that of the insulating layer.

11. The fabricating method of claim 10, wherein the first direction is approximately perpendicular to the second direction.

12. The fabricating method according to claim 10, wherein the co-patterning of the conductive layer and the insulating layer using the halftone mask comprises:

forming a photoresist, having a first height and a second height lower than the first height, on the insulating layer using the halftone mask;

removing the conductive layer and the insulating layer at regions other than regions below the photoresist through an etching process;

removing the photoresist having the second height and the insulating layer beneath the photoresist through ashing and etching processes to expose the exposed regions of the first connection patterns; and removing the photoresist that remains on the insulating layer through an ashing process.

13. The fabricating method according to claim 12, wherein the removing of the conductive layer and the insulating layer, formed at the other regions except the lower portion of the photoresist, through the etching process comprises removing the insulating layer through a dry etching process and then removing the conductive layer through a wet etching process.

14. The fabricating method according to claim 12, wherein, in the co-patterning of the conductive layer and the insulating layer using the halftone mask, the photoresist having the second height is formed on an interconnection area in order to pattern position detecting lines on the interconnection area while patterning the first connection patterns.

15. The fabricating method according to claim 10, wherein, in the patterning of the transparent electrode layer, second connection patterns connecting the second sensing patterns along the second direction are integrally formed with the second sensing patterns.

16. The fabricating method of claim 10, wherein the first sensing patterns and the second sensing patterns are each formed in a diamond shape, wherein corners of the first sensing patterns are adjacent to each other in the first direction and corners of the second sensing patterns are adjacent to each other in the second direction, and wherein columns of the first sensing patterns extending in the first direction intersect with rows of the second sensing patterns extending in the second direction.

* * * * *

UNITED STATES PATENT AND TRADEMARK OFFICE
CERTIFICATE OF CORRECTION

PATENT NO. : 8,435,724 B2
APPLICATION NO. : 12/957704
DATED : May 7, 2013
INVENTOR(S) : Woo-Sik Jun et al.

It is certified that error appears in the above-identified patent and that said Letters Patent is hereby corrected as shown below:

In the Claims

Column 8, Claim 2, line 64    After "comprises:"
                               Delete "f"

Signed and Sealed this
Twenty-first Day of October, 2014

Michelle K. Lee
*Deputy Director of the United States Patent and Trademark Office*